US00RE47195E

(19) United States
(12) Reissued Patent
Chiba

(10) Patent Number: US RE47,195 E
(45) Date of Reissued Patent: Jan. 8, 2019

(54) COPPER FOIL FOR PRODUCING GRAPHENE AND METHOD OF PRODUCING GRAPHENE USING THE SAME

(71) Applicant: JX Nippon Mining & Metals Corporation, Tokyo (JP)

(72) Inventor: Yoshihiro Chiba, Ibaraki (JP)

(73) Assignee: JX Nippon Mining & Metals Corporation, Tokyo (JP)

(21) Appl. No.: 15/432,383

(22) Filed: Feb. 14, 2017

Related U.S. Patent Documents

Reissue of:
(64) Patent No.: 9,260,310
Issued: Feb. 16, 2016
Appl. No.: 13/985,931
PCT Filed: Feb. 20, 2012
PCT No.: PCT/JP2012/053945
§ 371 (c)(1),
(2) Date: Nov. 7, 2013
PCT Pub. No.: WO2012/111840
PCT Pub. Date: Aug. 23, 2012

(30) Foreign Application Priority Data

Feb. 18, 2011 (JP) ..... 2011-033362
Nov. 16, 2011 (JP) ..... 2011-250982

(51) Int. Cl.
*C01B 31/02* (2006.01)
*C22F 1/02* (2006.01)
(Continued)

(52) U.S. Cl.
CPC ..... *C22C 9/00* (2013.01); *B82Y 30/00* (2013.01); *B82Y 40/00* (2013.01); *C01B 32/186* (2017.08);
(Continued)

(58) Field of Classification Search
CPC . C01B 31/0453; C01B 31/0484; B82Y 30/00; B82Y 40/00; C22C 9/00;
(Continued)

(56) References Cited

U.S. PATENT DOCUMENTS 5,800,905 A 8/1998 Sheridan et al.
7,479,590 B1 1/2009 Kuczynski
(Continued)

FOREIGN PATENT DOCUMENTS

EP 2 664 580 11/2013
JP 2000-256765 9/2000
(Continued)

OTHER PUBLICATIONS

Notice of Allowance corresponding to U.S. Appl. No. 14/738,076 dated Aug. 9, 2017.
(Continued)

*Primary Examiner* — Ling X Xu
(74) *Attorney, Agent, or Firm* — Jenkins, Wilson, Taylor & Hunt, P.A.

(57) ABSTRACT

A copper foil for producing graphene, having 60 degree gloss of 500% *or more* in a rolling direction and a direction transverse to *the* rolling direction, and an average crystal grain size of 200 μm or more after heating at 1000° C. for 1 hour in an atmosphere containing 20% by volume or more of hydrogen and balance argon.

9 Claims, 1 Drawing Sheet

(51) Int. Cl.

| | |
|---|---|
| ***C22F 1/08*** | (2006.01) |
| ***C22C 9/00*** | (2006.01) |
| ***B82Y 30/00*** | (2011.01) |
| ***B82Y 40/00*** | (2011.01) |
| ***B21B 1/40*** | (2006.01) |
| ***C01B 31/04*** | (2006.01) |
| ***C22C 9/02*** | (2006.01) |
| ***C23F 1/18*** | (2006.01) |
| ***B21B 3/00*** | (2006.01) |
| ***C01B 32/194*** | (2017.01) |
| ***C01B 32/186*** | (2017.01) |

(52) U.S. Cl.
CPC ..... *C01B 32/194* (2017.08); *C22C 9/02* (2013.01); *C22F 1/02* (2013.01); *C22F 1/08* (2013.01); *B21B 1/40* (2013.01); *B21B 2003/005* (2013.01); *C23F 1/18* (2013.01); *Y10T 428/12431* (2015.01)

(58) Field of Classification Search
CPC ..... C22C 9/02; C22F 1/02; C22F 1/08; B21B 1/40; B21B 2003/005; C23F 1/18; Y10T 428/12431
See application file for complete search history.

(56) References Cited

U.S. PATENT DOCUMENTS

| | | | | |
|---|---|---|---|---|
| 9,255,007 | B2 | 2/2016 | Chiba et al. | |
| 9,260,310 | B2 | 2/2016 | Chiba | |
| 9,359,212 | B2 | 6/2016 | Chiba et al. | |
| 9,487,404 | B2 | 11/2016 | Chiba et al. | |
| 9,840,757 | B2 | 12/2017 | Chiba | |
| 2001/0008091 | A1 | 7/2001 | Takahashi et al. | |
| 2002/0108422 | A1 | 8/2002 | Sugikawa | |
| 2004/0110015 | A1* | 6/2004 | Narui et al. | 428/458 |
| 2009/0010797 | A1 | 1/2009 | Aruga et al. | |
| 2009/0047539 | A1* | 2/2009 | Dobashi et al. | 428/607 |
| 2009/0155561 | A1 | 6/2009 | Choi et al. | |
| 2010/0038115 | A1* | 2/2010 | Matsuda et al. | 174/254 |
| 2010/0255970 | A1 | 10/2010 | Kogetsu et al. | |
| 2011/0070146 | A1 | 3/2011 | Song et al. | |
| 2011/0123389 | A1 | 5/2011 | Shindo et al. | |
| 2011/0195207 | A1 | 8/2011 | Hong et al. | |
| 2011/0201739 | A1 | 8/2011 | Beall | |
| 2012/0039344 | A1 | 2/2012 | Kian et al. | |
| 2012/0132516 | A1 | 5/2012 | Zimmerman | |
| 2014/0183160 | A1 | 7/2014 | Chiba et al. | |
| 2014/0196841 | A1 | 7/2014 | Chiba et al. | |
| 2014/0216650 | A1 | 8/2014 | Chiba | |
| 2014/0246399 | A1 | 9/2014 | Chiba | |
| 2014/0353278 | A1 | 12/2014 | Chiba et al. | |
| 2015/0232342 | A1 | 8/2015 | Chiba | |
| 2015/0361584 | A1 | 12/2015 | Chiba | |

FOREIGN PATENT DOCUMENTS

| | | | |
|---|---|---|---|
| JP | 2000-328158 | A | 11/2000 |
| JP | 2002-120050 | | 4/2002 |
| JP | 2004-074214 | | 3/2004 |
| JP | 2004-284938 | | 10/2004 |
| JP | 2006-281249 | | 10/2006 |
| JP | 2006281249 | A * | 10/2006 |
| JP | 2006-326684 | | 12/2006 |
| JP | 2009-143799 | | 7/2009 |
| JP | 2009-215146 | | 9/2009 |
| JP | 2010-227971 | | 10/2010 |
| JP | 2011-051801 | | 3/2011 |
| JP | 2011-063506 | | 3/2011 |
| JP | 2011-070830 | | 4/2011 |
| JP | 2011-136357 | | 7/2011 |
| JP | 2011-162877 | | 8/2011 |
| JP | 2012-006824 | | 1/2012 |
| JP | 2012-201926 | | 10/2012 |
| JP | 2013-107036 | | 6/2013 |
| JP | 5298225 | | 9/2013 |
| JP | 5298225 | B1 * | 9/2013 |
| JP | 5721609 | | 5/2015 |
| WO | WO 2011/081044 | | 7/2011 |
| WO | WO 2012/111840 | | 8/2012 |
| WO | WO 2012/165051 | | 12/2012 |
| WO | WO 2012/165548 | | 12/2012 |
| WO | WO 2013/047053 | | 4/2013 |
| WO | WO 2013047053 | A1 * | 4/2013 |
| WO | WO 2013/065601 | | 5/2013 |
| WO | WO 2013/073367 | | 5/2013 |
| WO | WO 2013/168646 | | 11/2013 |
| WO | WO 2013168646 | A1 * | 11/2013 |
| WO | WO 2014/027528 | | 2/2014 |

OTHER PUBLICATIONS

Advisory Action corresponding to U.S. Appl. No. 14/355,348 dated Feb. 23, 2016.
English translation, Nakamura, JP 2010-227971, from Japan Platform for Patent Information, Aug. 6, 2015.
European Search Report corresponding to European Application No. 12793061.8-1355 dated May 12, 2015.
European Search Report corresponding to European Application No. 12793262.2-1355 dated May 12, 2015.
Interview Summary corresponding to U.S. Appl. No. 14/355,348 dated Jan. 21, 2016.
Interview Summary corresponding to U.S. Appl. No. 14/356,142 dated Feb. 1, 2016.
Japanese Industrial Standard. JIS-H3100, 2000.
Japanese Industrial Standard. JIS-H3250, 2000.
Japanese Industrial Standard. JIS-H3510, 1992.
Japanese Industrial Standard. JIS Z2241, 1993.
Japanese Industrial Standard. JIS Z8741, 1997.
Luo et al., "Large Scale Synthesis of Bi-Layer Graphene in Strongly Coupled Stacking Order," Condensed Matter, 1-20 (Dec. 3, 2010).
Machine Translation, Nakamura, JP 2010-227971, Oct. 2010.
Notice of Allowance corresponding to U.S. Appl. No. 13/985,931 dated Oct. 23, 2015.
Notice of Allowance corresponding to U.S. Appl. No. 14/356,142 dated Feb. 1, 2016.
Notice of Allowance corresponding to U.S. Appl. No. 14/122,942 dated Jul. 8, 2016.
Notification of Transmittal of Translation of the International Preliminary Report on Patentability (Chapter I or Chapter II of the Patent Cooperation Treaty) corresponding to International Patent Application No. PCT/JP2013/068636 dated Feb. 26, 2015.
Official Action corresponding to U.S. Appl. No. 13/985,931 dated May 8, 2015.
Official Action corresonding to U.S. Appl. No. 14/355,348 dated Nov. 3, 2015.
Official Action corresponding to U.S. Appl. No. 14/122,942 dated Feb. 11, 2016.
Official Action corresponding to U.S. Appl. No. 14/355,348 dated May 10, 2016.
Restriction Requirement corresponding to U.S. Appl. No. 14/355,348 dated Feb. 26, 2015.
Restriction Requirement correponding to U.S. Appl. No. 14/356,142 dated Mar. 12, 2015.
Restriction Requirement corresponding to U.S. Appl. No. 14/738,076 dated Jan. 9, 2017.
Smoukov et al., "Freestanding Three-Dimensional Copper Foils Prepared by Electroless Deposition on Micropatterned Gels," Advanced Materials, vol. 17, No. 6 pp. 751-755 (2005).
Sukang Bae et al., "Roll-to-ro ll production of 30-inch graphene films for transparent electrodes," Nature Nanotechnology, vol. 5, No. 8 pp. 574-578 (2010).
Official Action corresponding to U.S. Appl. No. 14/738,076 dated Apr. 13, 2017.
Corrected Notice of Allowability corresponding to U.S. Appl. No. 14/738,076 dated Oct. 16, 2017.

(56) References Cited

OTHER PUBLICATIONS

International Search Report corresponding to International Patent Application No. PCT/JP2012/059652 dated May 17, 2012.
International Search Report corresponding to International Patent Application No. PCT/JP2012/064077 dated Aug. 23, 2012.
Notification of Transmittal of Translation of the International Preliminary Report on Patentability (Chapter I or Chapter II of the Patent Cooperation Treaty) corresponding to International Patent Application No. PCT/JP2012/059652 dated Dec. 2, 2013.
Notification of Transmittal of Translation of the International Preliminary Report on Patentability (Chapter I or Chapter II of the Patent Cooperation Treaty) corresponding to International Patent Application No. PCT/JP2012/064077 dated Dec. 2, 2013.
Written Opinion corresponding to International Patent Application No. PCT/JP2012/053945 dated Aug. 18, 2013.
International Search Report corresponding to International Patent Application No. PCT/JP2012/053945 dated May 29, 2012.
Li et al., "Large-Area Synthesis of High-Quality and Uniform Graphene Films on Copper Foils," Science. vol. 324, No. 5932 pp. 1312-1314 (2009).
Luo et al., "Effect of Substrate Roughness and Feedstock Concentration on Growth of Water-Scale Graphene at Atmospheric Pressure," Chemistry of Materials. vol. 23, No. 6 pp. 1441-1447 (2011).
Notification of Transmittal of Translation of the International Preliminary Report on Patentability (Chapter I or Chapter II of the Patent Cooperation Treaty) corresponding to International Patent Application No. PCT/JP2012/053945 dated Aug. 22, 2013.
Alfa Aesar, copper foil product information available on line at http://www.alfa.com/ja/GP140W.pgm?task=product&srchtyp=ELEM&PSvalue=Copperfoil&element=Cu&group=988.0000 , downloaded Dec. 12, 2012.
European Search Report corresponding to European Application No. 12747854.3-1362 dated Oct. 6, 2014.
Gao et al., "Efficient Growth of High-Quality Graphene Films on Cu Foils by Ambient Pressure Chemical Vapor Deposition," Applied Physics Letters, vol. 97, No. 18, pp. 183109-1-183109-3 (Nov. 1, 2010).
International Search Report corresponding to International Patent Application No. PCT/JP2012/077745 dated Dec. 11, 2012.
International Search Report corresponding to International Patent Application No. PCT/JP2012/078124 dated Nov. 27, 2012.
Japanese Industrial Standard. JIS Z2241.
Luo et al., "Large Scale Synthesis of Bi-Layer Graphene in Strongly Coupled Stacking Order," Condensed Matter, 1-20 (Dec. 3, 2010); URL:http://aps.arxiv.org/ftp/arxiv/papers/1012/1012.0701.pdf.
Notification of Transmittal of Translation of the International Preliminary Report on Patentability (Chapter I or Chapter II of the Patent Cooperation Treaty) corresponding to International Patent Application No. PCT/JP2012/077745 dated May 8, 2014.
Notification of Transmittal of Translation of the International Preliminary Report on Patentability (Chapter I or Chapter II of the Patent Cooperation Treaty) corresponding to International Patent Application No. PCT/JP2012/078124 dated May 15, 2014.
Official Action corresponding to U.S. Appl. No. 14/122,930 dated Feb. 20, 2015.
Restriction Requirement corresponding to U.S. Appl. No. 14/356,142 dated Mar. 12,2015.
Restriction Requirement corresponding to U.S. Appl. No. 14/122,930 dated Dec. 3, 2014.
Restriction Requirement correspondingn to U.S. Appl. No. 14/355,348 dated Feb. 26, 2015.
Wofford et al., "Graphene Islands on Cu Foils: The Interplay between Shape, Orientation, and Defects," Nano Letters, vol. 10, pp. 4890-4896 (Oct. 27, 2010).
Written Opinion corresponding to International Patent Application No. PCT/JP2012/077745 dated Dec. 11, 2012.
Written Opinion corresponding to International Patent Application No. PCT/JP2012/078124 dated Nov. 15, 2012.
European Search Report corresponding to Eurpean Application No. 12845162.2-1362 dated Jan. 7, 2015.
International Search Report corresponding to International Patent Application No. PCT/JP2013/068636 dated Aug. 27, 2013.
Machine Translation, Nakamura, JP 2010-0227971, Oct. 2010.
Notification of Transmittal of Translation of the International Preliminary Report on Patentability (Chapter I or Chapter II of the Patent Cooperation Treaty) coresponding to International Patent Application No. PCT/JP2013/068636 dated Feb. 26, 2015.
Official Action corresponding to U.S. Appl. No. 14/122,930 dated Jun. 18, 2015.
Official Action corresponding to U.S. Appl. No. 14/355,348 dated Jun. 4, 2015.
Official Action corresponding to U.S. Appl. No. 14/356,142 dated Jun. 8, 2015.
European Search Report corresponding to European Application No. 128505344-1362. dated Nov. 3, 2015.
Notice of Allowance corresponding to U.S. Appl. No. 14/122,930 dated Oct. 7, 2015.
Notice of Allowance corresponding to U.S. Appl. No. 14/356,142 dated Oct. 27, 2015.
Official Action corresponding to U.S. Appl. No. 14/355,348 dated Nov. 3, 2015.
Official Action corresponding to European Patent Application No. 12850534.4-1362 dated Dec. 8, 2015.
Restriction Requirement corresponding to U.S. Appl. No. 14/122,942 dated Sep. 30, 2015.

* cited by examiner

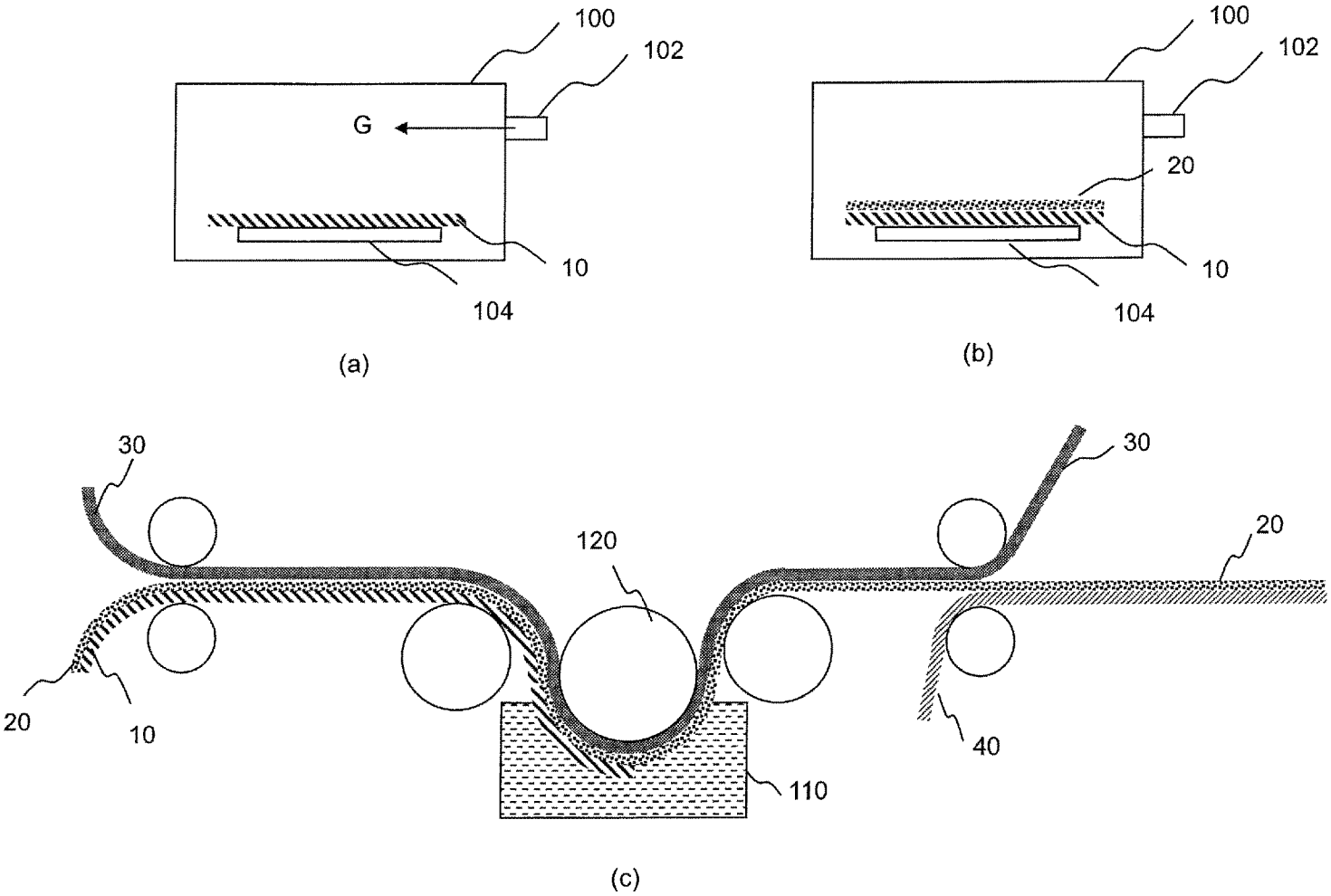
100
102
G
10
104
(a)
100
102
20
10
104
(b)
30
20
40
110
120
30
10
20
(c)

COPPER FOIL FOR PRODUCING GRAPHENE AND METHOD OF PRODUCING GRAPHENE USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a copper foil base for producing graphene, and a method of producing graphene using the same.

DESCRIPTION OF THE RELATED ART

Graphite has a layered structure where a plurality of layers of carbon six-membered rings planarly arranged is laminated. The graphite having a mono atomic layer or around several atomic layers is called as graphene or a graphene sheet. The graphene sheet has own electrical, optical and mechanical properties, and in particularly has a high carrier mobility speed. Therefore, the graphene sheet has expected to be applied in various industries as a fuel cell separator, a transparent electrode, a conductive thin film for a display device, a "mercury-free" fluorescent lamp, a composite material, a carrier for Drug Delivery System (DDS) etc.

As a method of producing the graphene sheet, it is known that graphite is peeled with an adhesion tape. However, there are problems in that the number of the layer(s) of the graphene sheet obtained is not uniform, a wide area graphene sheet is difficult to be provided, and it is not suitable for mass production.

A technology has been developed that a sheet-like monocrystal graphitized metal catalyst is contacted with a carboneous substance and then is heat treated to grow the graphene sheet (Chemical Vapor Deposition (CVD) method) (Patent Literature 1). As the monocrystal graphitized metal catalyst, there is described a metal substrate made of Ni, Cu or W, for example.

Similarly, a technology has been reported that a graphene film is formed by the chemical vapor deposition method on a copper layer formed on an Ni or Cu metal foil or an Si substrate. The graphene film is formed at about 1000° C. (Non-Patent Literature 1).

PATENT LITERATURE

[Patent Literature 1] Japanese Unexamined Patent Publication (Kokai) 2009-143799

PATENT LITERATURE

[Non-Patent Literature 1] SCIENCE Vol. 324 (2009) P1312-1314

Problems to be Solved by the Invention

However, it is not easy and spends high costs to produce the monocrystal metal substrate, a wide area substrate is difficult to be provided, and a wide area graphene sheet is thus difficult to be provided, as described in Patent Document 1. On the other hand, Non-Patent Document 1 describes that Cu is used as the substrate. Graphene is not grown on a copper foil in a plane direction within a short time. A Cu layer formed on an Si substrate is annealed to provide coarse grains, thereby providing a substrate. In this case, a size of graphene is limited to the size of the Si substrate, and its production costs are high, too.

Specifically, an object of the present invention is to provide a copper foil for producing graphene being capable of producing graphene having a large area with low costs, and a method of producing graphene using the same.

Means for Solving the Problems

A first aspect of the present invention provides a copper foil for producing graphene, having 60 degree gloss of 500% *or more* in a rolling direction and a direction transverse to *the* rolling direction, and an average crystal grain size of 200 μm or more after heating at 1000° C. for 1 hour in an atmosphere containing 20% by volume or more of hydrogen and balance argon.

Preferably, the average crystal grain size is 400 μm or more. More preferably, the average crystal grain size is 900 μm or more. Preferably, a superficial arithmetic mean roughness Ra is 0.05 μm or less.

A second aspect of the present invention provides a copper foil for producing graphene, having a superficial arithmetic mean roughness Ra is 0.05 μm or less. Preferably, the arithmetic mean roughness Ra is 0.03 μm or less.

Preferably, the copper foil for producing graphene of the present invention consists of tough pitch copper in accordance with JIS-H3100-*2000* or JIS-H3250-*2000*; or consists of oxygen free copper in accordance with JIS-H3100-*2000* or JIS-H3510-*1992*, or contains 0.050% by mass or less of one or more of elements selected from the group consisting of Sn and Ag to the tough pitch copper or the oxygen free copper.

Further, the present invention provides a method of producing [grapheme] *graphene* using the copper foil for producing graphene according to [any one of Claims 1 to 7] *the present invention*, comprising the steps of: providing a carbon-containing gas while placing the heated copper foil to form graphene on a surface of the copper foil for producing graphene; laminating a transfer sheet on the surface of the graphene, and etching and removing the copper foil for producing graphene while transferring the graphene to the transfer sheet.

Effect of the Invention

According to the present invention, there can be provided a copper foil being capable of producing graphene having a large area with low costs.

BRIEF DESCRIPTION OF DRAWING

FIG. 1 A process chart showing a method of producing graphene according to an embodiment of the present invention.

DESCRIPTION OF THE PREFERRED EMBODIMENTS

Hereinafter, a copper foil for producing graphene according to an embodiment of the present invention will be described. The symbol "%" herein refers to % by mass, unless otherwise specified.

Composition

As the copper foil for producing graphene, tough pitch copper (TPC) in accordance with JIS-H3250-*2000* or JIS-H3100-*2000* or oxygen free copper (OFC) in accordance with JIS-H3510-*1992* or JIS-H3100-*2000* can be used.

In addition, to the tough pitch copper or the oxygen free copper, a composition containing 0.050% by mass or less of one or more of elements selected from the group consisting of Sn and Ag can be used. When the above-described elements are contained, the copper foil can have improved strength and adequate elongation, and the grain size can be increased. If a content percentage of the above-described elements exceeds 0.050% by mass, the strength may be further increased, but the elongation may be decreased to degrade workability and suppress the growth of the grain size. More preferably, the content percentage of the above-described elements is 0.040% by mass or less.

Although a lower limit of the content percentage of the above-described elements is not especially limited, the lower limit may be 0.005% by mass, for example. If the content percentage of the above-described elements is less than 0.005% by mass, the content percentage may be difficult to be controlled.

Thickness

The thickness of the copper foil for producing graphene is not especially limited, but is generally 5 to 150 μm. Preferably, the thickness of the copper foil is 12 to 50 μm for ease of etching and removal as described later while assuring handleability. If the thickness of the copper foil for producing graphene is less than 12 μm, it may be easily broken and have less handleability. If the thickness exceeds 50 μm, etching and removal may be difficult.

60 Degree Gloss 60 degree gloss (JIS Z8741-*1997*) of the copper foil for producing graphene is 500% or more both in a rolling direction and a direction transverse to rolling direction.

As described later, after graphene is produced using the copper foil for producing graphene according to the present invention, the graphene is needed to be transferred from the copper foil to a transfer sheet. It is found that when a surface of the copper foil is rough, it is difficult to transfer the graphene, and the graphene is broken. As an indicator for representing a surface irregularity of the copper foil, 60 degree gloss is specified.

When the 60 degree gloss in a rolling direction or a direction transverse to rolling direction is less than 500%, the graphene is broken upon the transfer. An upper limit of the 60 degree gloss in a rolling direction or a direction transverse to rolling direction is not especially limited, but about 800% is practically the upper limit.

In addition, in order to ease the transfer of the graphene to the transfer sheet, the surface of the copper foil for producing graphene has an arithmetic mean roughness Ra in accordance with JIS B0601-*1994* of preferably 0.05 μm or less, and more preferably 0.03 μm or less. Although a lower limit of the Ra is not needed to be especially limited, it is considered that the lower limit value of the Ra on the surface of the copper foil that can be produced is about 0.01 μm.

Average Crystal Grain Size

After the cooper foil for producing graphene is heated at 1000° C. for 1 hour in an atmosphere containing 20% by volume or more of hydrogen and balance argon, an average crystal grain size thereof is 200 μm or more.

If the average crystal grain size of the cooper foil for producing graphene is less than 200 μm, it makes an obstacle for growth of the graphene on the surface of the copper foil for producing graphene, and the graphene is difficult to be grown in a planar direction. It may because a crystal grain boundary makes the obstacle for the growth of the graphene. In particular, the average crystal grain size of the copper foil for producing graphene is preferably 900 μm or more.

The heating at 1000° C. for 1 hour in an atmosphere containing 20% by volume or more of hydrogen and balance argon is simulated for a condition of heating the copper foil for producing graphene at a decomposition temperature of the carbon-containing gas or more, when graphene is produced.

Further, the average crystal grain size is determined by measuring the copper foil for producing graphene with a cutting method by JIS H0501-*1986*.

Using the copper foil for producing graphene as specified above, the large-area graphene can be produced at low costs and a high yield.

Production of Copper Foil for Producing Graphene

The copper foil for producing graphene according to the embodiment of the present invention can be produced as follows, for example: Firstly, a copper ingot having a predetermined composition is produced, is hot rolled, and is annealed and cold rolled repeatedly to provide a rolled sheet. The rolled sheet is annealed to be re-crystallized, and finally cold rolled to the predetermined thickness of a rolling reduction of 80 to 99.9% (preferably 85 to 99.9%, more preferably 90 to 99.9%), thereby providing a copper foil.

It is important here to control the 60 degree gloss of the copper foil for producing graphene to 500% or more. As one method to perform this, an oil film equivalent will be 18000 or less both at a final pass of the final cold rolling and a previous pass before the final pass of the final cold rolling.

A rolled copper foil is generally processed at high speed with oil lubrication. When a lubricated oil film becomes thinner, shear band deformation is prone to be dominant. This is a common phenomenon which applies to typical metals. The shear band is not necessarily preferable to the growth of the crystal grains when annealed. High and low or shallow and deep of the shear band can be presented by the gloss on the surface of the copper foil. Specifically, as the phenomenon upon rolling, an oil pit (irregularity) is generated on a rolling processed surface when the oil film that is introduced between the roll and the material is thick. When the oil film is thin, an area that is contacted with the rolling roll on the surface of the material is increased. As a result, free deformation is limited, the oil pit is not grown, a smooth surface profile of the rolling roll is transferred and a smooth surface is formed. Because of this, as an indicator of the thin oil film, the oil film equivalent is limited to 18000 or less. If the oil film equivalent exceeds 18000, the 60 degree gloss on the surface of the copper foil is less than 500%.

The oil film equivalent is represented by the following equation:

$$\text{(Oil film equivalent amount)}=\{(\text{rolling oil viscosity, kinetic viscosity at } 40^\circ\text{ C., cSt})\times(\text{rolling speed; m/min})\}/\{(\text{yield stress of material; kg/mm}^2)\times(\text{roll angle of bite; rad})\}$$

In order to limit the oil film equivalent to 18000 or less, it is preferable that the rolling oil viscosity (kinetic viscosity at 40° C.) is low, the rolling speed is low, and the roll angle of bite (corresponding to a rolling reduction) is high. For example, by a rolling roll adjusted to have a roll diameter of 250 mm or less and surface roughness $Ra_{roll}$ of 0.1 μm or less (preferably 0.01 to 0.04 μm, more preferably 0.01 to 0.02 μm), rolling oil having a viscosity of 3 to 8 cSt (preferably 3 to 5 cSt, more preferably 3 to 4 cSt) is used. A rolling speed may be 100 to 500 m/min (preferably 200 to 450 m/min, more preferably 250 to 400 m/min), and the rolling reduction per pass may be 10 to 60%. The roll angle of bite is, for example, 0.001 to 0.04 rad, preferably 0.002 to 0.03 rad, more preferably 0.003 to 0.03 rad.

If the surface roughness $Ra_{roll}$ of the rolling roll exceeds 0.1 μm, the irregularity of the roll surface is transferred and smoothness of the material surface is impaired. By rolling under the above-described conditions, a surface flatness having no oil pit can have a wide area. If the viscosity of the rolling oil exceeds 8 cSt, the oil film equivalent is increased, thereby providing no surface gloss. On the other hand, if the oil film equivalent is less than 3 cSt, rolling resistance is too increased to increase the rolling reduction. If the rolling speed exceeds 500 m/min, the oil amount introduced is increased, thereby decreasing the gloss. On the other hand, if the rolling speed is less than 100 m/min, the rolling reduction is not sufficiently provided and it is inconvenience from the standpoint of the productivity.

If the rolling reduction exceeds 99.9%, work hardening is accelerated to lose deformation capability, and the rolling reduction in the last pass is not ensured. On the other hand, if the rolling reduction is less than 80%, a rolling texture is not grown, thereby providing no surface flatness. If the roll angle of bite exceeds 0.04 rad, a difference between a roll peripheral speed and a material speed becomes great to lose the smoothness of the material surface. On the other hand, the roll angle of bite is less than 0.002 rad, the oil enters between the rolling roll and the material to be rolled and the amount of the oil is too great to lubricate, thereby decreasing the gloss.

The rolling reduction per pass is, for example, 20 to 40%, preferably 20 to 35%, more preferably 25 to 35%. If the rolling reduction exceeds 35%, the shear band is grown to produce the oil pit, thereby decreasing the gloss. On the other hand, if the rolling reduction is less than 20%, the number of passes increases to degrade the productivity.

Furthermore, as another method to control the 60 degree gloss of the copper foil for producing graphene to 500% or more, a material temperature is increased during the final cold rolling. When the material temperature is increased, dislocation recovery is induced to resist the shear band deformation. The material temperature has no sense when oil lubricity is lost or the copper foil is re-crystallized, and may be 120° C. or less, preferably 100° C. or less. If the material temperature is 50° C. or less, there is almost no effect to prevent the shear band deformation.

By the above-described methods, it is possible to control the 60 degree gloss of the copper foil for producing graphene to 500% or more. When the 60 degree gloss of the copper foil is 500% or more, it is found that the crystal grain size after annealing is 200 μm or more. This may be because the crystal growth after annealing is promoted by controlling the oil film equivalent or the material temperature during the final cold rolling to resist the shear band deformation as described above.

Controlling the 60 degree gloss of the copper foil for producing graphene to 500% or more is not limited to the above-described methods.

Method of Producing Graphene

Next, referring to FIG. 1, a method of producing graphene according to the embodiment of the present invention will be described.

First, the above-described copper foil 10 for producing graphene of the present invention is placed in a chamber (such as a vacuum chamber) 100 and is heated by a heater 104. At the same time, the pressure in the chamber 100 is reduced or the chamber 100 is vacuum-evacuated. Then, a carbon-containing gas G is fed to the chamber 100 through a gas supply inlet 102 (FIG. 2(a)). As the carbon-containing gas G, carbon dioxide, carbon monoxide, methane, ethane, propane, ethylene, acetylene, alcohol or the like is cited, but is not limited thereto. One or more of these gases may be mixed. The copper foil 10 for producing graphene may be heated at a decomposition temperature of the carbon-containing gas G or more. For example, the temperature can be 1000° C. or more. Alternatively, the carbon-containing gas G may be heated at the decomposition temperature or more within the chamber 100, and the decomposed gas may bring into contact with the copper foil 10 for producing graphene.

Thus, the decomposition gas (carbon gas) forms graphene 20 on the surface of the copper foil 10 for producing graphene (FIG. 2(b)).

Then, the copper foil 10 for producing graphene is cooled to normal temperature, a transfer sheet 30 is laminated on the surface of the graphene 20, and the graphene 20 is transferred to the transfer sheet 30. Next, the laminate is continuously immersed into an etching tank 110 via a sink roll 120, and the copper foil 10 for producing graphene is removed by etching (FIG. 2 (c)). In this way, the graphene 20 laminated on the predetermined transfer sheet 30 can be produced.

In addition, the laminate from which the copper foil 10 for producing graphene is removed is pulled up, and a substrate 40 is laminated on the graphene 20. While the graphene 20 is transferred to the substrate 40, the transfer sheet 30 is removed, whereby the graphene 20 laminated on the substrate 40 can be produced.

As the transfer sheet 30, a variety of resin sheets (a polymer sheet such as polyethylene, polyurethane etc.) can be used. As an etching liquid for etching and removing the copper foil 10 for producing graphene, a sulfuric acid solution, a sodium persulfate solution, a hydrogen peroxide and sodium persulfate solution, or a solution where sulfuric acid is added to hydrogen peroxide can be, for example, used. As the substrate 40, an Si, SiC, Ni or Ni alloy can be, for example, used.

EXAMPLE

Preparation of Sample

A cooper ingot having a composition shown in Table 1 was prepared, was hot rolled at 800 to 900° C., and was annealed in a continuous annealing line at 300 to 700° C. and cold rolled, which was repeated one time, to provide a rolled sheet having a thickness of 1 to 2 mm. The rolled sheet was annealed and re-crystallized in the continuous annealing line at 600 to 800° C., and was finally cold rolled to a thickness of 7 to 50 μm of a rolling reduction of 95 to 99.7% to provide each copper foil in Examples 1 to 15 and Comparative Examples 1 to 9.

Here, the oil film equivalents were adjusted to the values shown in Table 1 both at a final pass of the final cold rolling and a previous pass before the final pass of the final cold rolling.

The oil film equivalent is represented by the following equation:

(Oil film equivalent amount)={(rolling oil viscosity, kinetic viscosity at 40° C., cSt)×(rolling speed; m/min)}/{(yield stress of material; kg/mm$^2$)×(roll angle of bite; rad)}

Measurement of 60 Degree Gross

The copper foils in Examples 1 to 15 and Comparative Examples 1 to 9 were final cold rolled and were heated at 1000° C. for 1 hour in an atmosphere containing 20% by volume or more of hydrogen and balance argon. Thereafter, the 60 degree gross on each surface was measured.

The 60 degree gross was measured using a gloss meter in accordance with JIS-Z8741-*1997* (trade name "PG-1M" manufactured by Nippon Denshoku Industries Co., Ltd.)

Measurement of Surface Roughness (Ra, Rz, Sm)

The copper foils in Examples 1 to 15 and Comparative Examples 1 to 9 were final cold rolled and were heated at 1000° C. for 1 hour in an atmosphere containing 20% by volume or more of hydrogen and balance argon. Thereafter, the surface roughness of each was measured.

A contact roughness meter (trade name "SE-3400" manufactured by Kosaka Laboratory Ltd.) was used to measure an arithmetic mean roughness (Ra; μm) in accordance with JIS-B0601-*1994* was measured. As to an oil pit depth Rz, a ten point height of roughness profile was measured in accordance with JIS B0601-1994. Under the conditions of a measurement sampling length of 0.8 mm, an evaluation length of 4 mm, a cut off value of 0.8 mm and a feed rate of 0.1 mm/sec, ten measurements were done in parallel with a rolling direction at different measurement positions, and values for ten measurements were determined in each direction. As to a mean distance of the irregularities (Sm; mm), under the conditions of a measurement sampling length of 0.8 mm, an evaluation length of 4 mm, a cut off value of 0.8 mm and a feed rate of 0.1 mm/sec, ten measurements were done in parallel with a rolling direction at different measurement positions, and values for ten measurements were determined in each direction. The Sm is defined as "Mean width of the profile elements" by JIS B0601-2001 (in accordance with ISO4287-1997) that represents a surface texture by a profile curve method, and refers to an average of profile lengths of respective irregularities in a sampling length.

Measurement of Average Crystal Grain Size

For each copper foil in Examples 1 to 15 and Comparative Examples 1 to 9, the average crystal grain size was measured with a cutting method by JIS H0501-*1986*.

Production of Graphene

The copper foil (horizontal and vertical 100×100 mm) in each Example was placed in a vacuum chamber, and heated at 1000° C. Under vacuum (pressure: 0.2 Torr), methane gas was fed into the vacuum chamber (fed gas flow rate: 10 to 100 cc/min), the copper foil was heated to 1000° C. for 30 minutes and held for 1 hour to grow graphene on the surface of the copper foil.

In each Example, graphene was tried to be produced ten times under the above-described conditions, and the surface of the copper foil was observed by the atomic force microscope (AFM) for graphene. When scale-like irregularities were observed on the whole surface by the AFM, graphene might be produced. Based on the number of times of the graphene production when graphene was tried to be produced ten times, a yield was evaluated by the following rating: The rating "Excellent", "Good", or "Not bad" may not have practical problems.

Excellent: Graphene was produced five times or more, when graphene was tried to be produced ten times Good: Graphene was produced four times, when graphene was tried to be produced ten times Not bad: Graphene was produced three times, when graphene was tried to be produced ten times Bad: Graphene was produced two times or less, when graphene was tried to be produced ten times Table 1 shows the obtained result. In Table 1, $G60_{RD}$ and $G60_{TD}$ represent 60 degree gloss in a rolling direction and a direction transverse to rolling direction, respectively. GS shows the average crystal grain size.

Also in Table 1, "TPC" in Examples 1 to 7, 14 and 15 and Comparative Examples 1 to 3, 7 and 9 represents tough pitch copper in accordance with JIS-H3100-*2000*. "OFC" in Examples 9 to 12 and Comparative Examples 4 to 6 and 8 represents oxygen free copper in accordance with JIS-H3100-*2000*. TPC in Example 13 represents tough pitch copper in accordance with JIS-H3250-*2000*. OFC in Example 8 represents oxygen free copper in accordance with JIS-H3510-*1992*.

In view of this, "OFC+Sn 1200 ppm" in Comparative Example 8 represents that 1200 wt ppm of Sn was added to oxygen free copper in accordance with JIS-H3100-*2000*.

TABLE 1

| | | Oil film | | Properties after final rolling | | | | |
|---|---|---|---|---|---|---|---|---|
| | | equivaltent amount at final | Sheet thickness | 60 degree gloss | | Surface roughness (μm) | | |
| | Composition (wtppm) | cold rolling | (μm) | $G60_{RD}$ | $G60_{TD}$ | Ra | Rz | Rsm |
| Example 1 | TPC + Ag190 ppm | 15,000 | 7 | 567 | 557 | 0.04 | 0.25 | 10.182 |
| Example 2 | TPC + Ag190 ppm | 15,000 | 12 | 565 | 555 | 0.04 | 0.25 | 10.171 |
| Example 3 | TPC + Ag190 ppm | 15,000 | 35 | 569 | 559 | 0.03 | 0.25 | 10.202 |
| Example 4 | TPC + Ag190 ppm | 15,000 | 50 | 567 | 556 | 0.04 | 0.25 | 10.172 |
| Example 5 | TPC + Ag100 ppm | 15,000 | 12 | 542 | 530 | 0.03 | 0.27 | 10.385 |
| Example 6 | TPC + Ag300 ppm | 15,000 | 15 | 581 | 569 | 0.03 | 0.23 | 9.857 |

TABLE 1-continued

| | | | | | | | | |
|---|---|---|---|---|---|---|---|---|
| Example 7 | TPC-Ag430 ppm | 15,000 | 10 | 560 | 543 | 0.04 | 0.24 | 10.118 |
| Example 8 | OFC + Sn50 ppm | 12,000 | 18 | 593 | 578 | 0.03 | 0.21 | 10.001 |
| Example 9 | OFC + Sn300 ppm | 12,000 | 30 | 577 | 571 | 0.030 | 0.26 | 11.003 |
| Example 10 | OFC-Sn470 ppm | 12,000 | 18 | 567 | 552 | 0.034 | 0.28 | 9.987 |
| Example 12 | OFC-Sn80 ppm—Ag70 ppm | 12,000 | 40 | 585 | 592 | 0.027 | 0.22 | 10.087 |
| Example 12 | OFC | 12,000 | 50 | 560 | 555 | 0.03 | 0.24 | 10.887 |
| Example 13 | TPC | 15,000 | 35 | 531 | 520 | 0.04 | 0.29 | 11.254 |
| Example 14 | TPC | 17,000 | 18 | 505 | 502 | 0.04 | 0.29 | 11.301 |
| Example 15 | TPC + Ag190 ppm | 10,000 | 12 | 630 | 625 | 0.010 | 0.105 | 12.421 |
| Comparative Example 1 | TPC + Ag190 ppm | 25,000 | 12 | 135 | 127 | 0.15 | 0.83 | 10.461 |
| Comparative Example 2 | TPC + Ag100 ppm | 25,000 | 18 | 107 | 158 | 0.19 | 0.98 | 9.888 |
| Comparative Example 3 | TPC + Ag300 ppm | 28,000 | 35 | 95 | 142 | 0.21 | 0.79 | 9.521 |
| Comparative Example 4 | OFC + Sn50 ppm | 25,000 | 10 | 145 | 145 | 0.17 | 0.75 | 9.447 |
| Comparative Example 5 | OFC + Sn300 ppm | 23,000 | 12 | 202 | 190 | 0.12 | 0.69 | 9.883 |
| Comparative Example 6 | OFC | 25,000 | 35 | 131 | 137 | 0.18 | 0.78 | 10.122 |
| Comparative Example 7 | TPC | 30,000 | 18 | 94 | 108 | 0.23 | 0.81 | 9.556 |
| Comparative Example 8 | OFC + Sn1200 ppm | 23,000 | 50 | 225 | 230 | 0.11 | 0.66 | 10.226 |
| Comparative Example 9 | TPC | 21,000 | 12 | 280 | 272 | 0.09 | 0.54 | 9.722 |

| | Properties after heating at 1000° C. | | | | | | |
|---|---|---|---|---|---|---|---|
| | 60 degree gloss | | Surface roughness (μm) | | | GS | Yield of |
| | $G60_{RD}$ | $G60_{TD}$ | Ra | Rz | Rsm | (μm) | graphene |
| Example 1 | 588 | 581 | 0.032 | 0.206 | 18.98 | 950 | Excellent |
| Example 2 | 586 | 579 | 0.033 | 0.209 | 18.96 | 950 | Excellent |
| Example 3 | 590 | 583 | 0.031 | 0.204 | 19 | 950 | Excellent |
| Example 4 | 588 | 580 | 0.032 | 0.208 | 18.97 | 950 | Excellent |
| Example 5 | 555 | 542 | 0.028 | 0.244 | 18.23 | 935 | Excellent |
| Example 6 | 591 | 580 | 0.030 | 0.215 | 16.88 | 910 | Excellent |
| Example 7 | 587 | 578 | 0.033 | 0.234 | 16 | 700 | Good |
| Example 8 | 601 | 590 | 0.022 | 0.201 | 17.21 | 1120 | Excellent |
| Example 9 | 580 | 577 | 0.027 | 0.253 | 19.2 | 1030 | Excellent |
| Example 10 | 576 | 569 | 0.029 | 0.255 | 18.55 | 405 | Good |
| Example 12 | 595 | 603 | 0.022 | 0.208 | 18.12 | 980 | Excellent |
| Example 12 | 569 | 561 | 0.024 | 0.219 | 19.02 | 1000 | Excellent |
| Example 13 | 547 | 528 | 0.034 | 0.270 | 19.55 | 900 | Excellent |
| Example 14 | 511 | 507 | 0.036 | 0.281 | 19.02 | 250 | Not bad |
| Example 15 | 645 | 641 | 0.009 | 0.095 | 22.326 | 1350 | Excellent |
| Comparative Example 1 | 152 | 135 | 0,091 | 0.419 | 20.5 | 110 | Bad |
| Comparative Example 2 | 120 | 168 | 0.104 | 0.574 | 20.02 | 130 | Bad |
| Comparative Example 3 | 108 | 152 | 0.152 | 0.472 | 19.54 | 120 | Bad |
| Comparative Example 4 | 155 | 154 | 0.110 | 0.471 | 18.47 | 130 | Bad |
| Comparative Example 5 | 220 | 196 | 0.085 | 0.398 | 19.02 | 150 | Bad |
| Comparative Example 6 | 138 | 147 | 0.109 | 0.511 | 20.01 | 190 | Bad |
| Comparative Example 7 | 99 | 117 | 0.154 | 0.597 | 19.52 | 110 | Bad |
| Comparative Example 8 | 230 | 239 | 0.077 | 0.416 | 20.95 | 100 | Bad |
| Comparative Example 9 | 285 | 279 | 0.069 | 0.401 | 18.88 | 175 | Bad |

As apparent from Table 1, in each of Examples 1 to 15 where 60 degree gloss on the surface of the copper foil was 500% or more, and the average crystal grain size after heating at 1000° C. for 1 hour in an atmosphere containing 20% by volume or more of hydrogen and balance argon, the production yield of graphene was excellent.

In particular, in each of Examples 1 to 6, 8, 9, 11 to 13 and 15 where the average crystal grain size after heating at 1000° C. for 1 hour in an atmosphere containing 20% by volume or more of hydrogen and balance argon was 900 μm or more, the production yield of graphene was most excellent. Also, in each of Examples 7 and 10 where the average crystal grain size after heating at 1000° C. for 1 hour in an atmosphere containing 20% by volume or more of hydrogen and balance argon was 400 to 900 μm, the production yield of graphene was better as compared with that in Example 14 where the average crystal grain size was less than 400 μm.

On the other hand, in each of Comparative Examples 1 to 9 where the oil film equivalent exceeded 18000 both at a final pass of the final cold rolling and a previous pass before the final pass of the final cold rolling, and 60 degree gloss on the surface of the copper foil was less than 500%, the production yield of graphene was poor. Also, in each of Comparative Examples 1 to 9, the average crystal grain size after heating at 1000° C. for 1 hour in an atmosphere containing 20% by volume or more of hydrogen and balance argon was less than 200 μm. It is considered that the oil film equivalent at final cold rolling was too high to cause the shear band, thereby suppressing the grow of the crystal grains.

EXPLANATION OF REFERENCE NUMERALS

10 copper foil for producing graphene
20 graphene
30 transfer sheet

What is claimed is:

1. A rolled copper foil for producing graphene, having 60 degree gloss of 500% *or more* in a rolling direction and a direction transverse to *the* rolling direction, and an average crystal grain size of 200 μm or more after heating at 1000° C. for 1 hour in an atmosphere containing 20% by volume or more of hydrogen and balance argon.

2. The rolled copper foil for producing graphene according to claim 1, wherein the average crystal grain size is 400 μm or more.

3. The rolled copper foil for producing graphene according to claim 1, wherein the average crystal grain size is 900 μm or more.

4. The rolled copper foil for producing graphene according to claim 1, wherein a superficial arithmetic mean roughness Ra is 0.05 μm or less.

5. A rolled copper foil for producing graphene, having an average crystal grain size of 200 μm or more after heating at 1000° C. for 1 hour in an atmosphere containing 20% by volume or more of hydrogen and balance argon, and wherein a superficial arithmetic mean roughness Ra is 0.05 μm or less.

6. The rolled copper foil for producing graphene according to claim 5, wherein the superficial arithmetic mean roughness Ra is 0.03 μm or less.

7. The rolled copper foil for producing graphene according to claim 1, prepared from a copper composition consisting of tough pitch copper in accordance with JIS-H3100-*2000* or JIS-H3250-*2000*; consisting of oxygen free copper in accordance with JIS-H3100-*2000* or JIS-H3510-*1992*; or consisting of a composition wherein 0.050% by mass or less of one or more elements selected from the group consisting of Sn and Ag is added to the tough pitch copper or the oxygen free copper.

8. A method of producing graphene using the rolled copper foil for producing graphene according to claim 1, comprising the steps of:

heating the rolled copper foil for producing graphene while providing a carbon-containing gas to form graphene on a surface of the heated rolled copper foil; and laminating a transfer sheet on the surface of the graphene, and etching and removing the rolled copper foil for producing graphene while transferring the graphene to the transfer sheet.

9. The rolled copper foil of according to claim 1, having an oil film equivalent upon final rolling of 18000 or less.

* * * * *